April 23, 1935.  H. EBERT  1,999,091
ADJUSTING GEARING FOR VARIABLE PITCH PROPELLERS
Filed Oct. 28, 1933
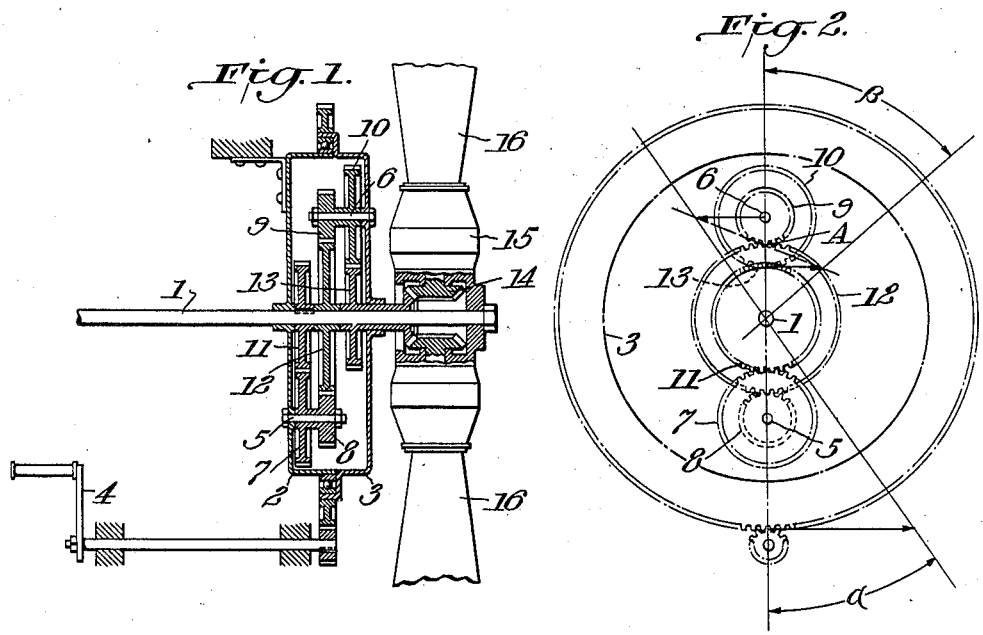
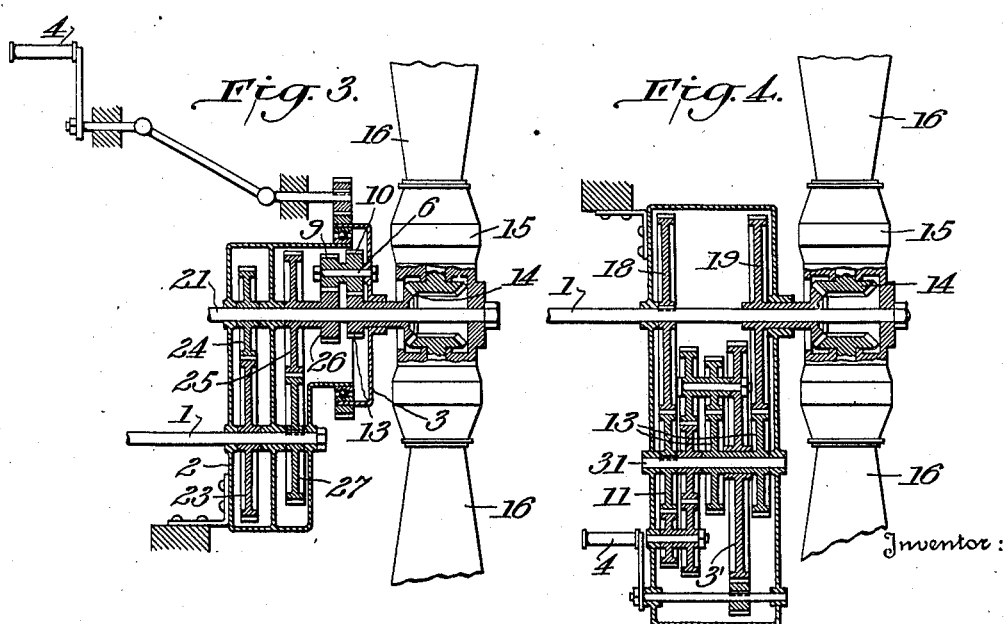
Inventor:
Heinrich Ebert,
By Potter, Pierce & Scheffler,
Attorneys.

Patented Apr. 23, 1935

1,999,091

UNITED STATES PATENT OFFICE 1,999,091

ADJUSTING GEARING FOR VARIABLE PITCH PROPELLERS

Heinrich Ebert, Frankfort-on-the-Main, Germany, assignor to Vereinigte Deutsche Metallwerke Aktiengesellschaft, Einsal, near Altena, Germany, a corporation of Germany Application October 28, 1933, Serial No. 695,683
In Germany November 2, 1932

8 Claims. (Cl. 170—163)

This invention relates to adjustable gearing for variable-pitch propellers, more particularly on aircraft, consisting of a drive gear or gearing, rigidly connected to the source of power, and a gear capable of angular displacement relative to the drive gear and loose on its shaft and interconnecting gearing for angular adjustment of the propeller blades on their axes.

For varying the pitch of propellers while running, a number of types of devices are known, which may be divided, in point of principle, into the following three main groups.

(1) Adjusting devices by means of which the propeller blades are adjusted by the displacement of a member in the longitudinal direction of the propeller shaft.

(2) Adjusting devices in which the adjustment is effected automatically, for example by the centrifugal action of structural members which rotate with the propeller.

(3) Adjusting devices in which the adjustment of the propeller blades is obtained by purely rotational motion, for example by means of gearing.

The types comprised under 1 are generally simple, but are attended with the drawbacks of limited range of adjustment and too great structural length.

The types comprised under 2 are not applicable to all purposes.

On the other hand, those in group 3 possess the advantages of unlimited range of adjustment and small structural length. The present invention as hereinafter described and illustrated, belongs to this group.

Heretofore adjusting gearing of the type under group 3 has been constructed as a planetary gearing, i. e. as a gearing in which the planetary gears turn around the propeller shaft and mesh with a gear with outer teeth fixed to and rotating with the propeller shaft and with an adjustable gear with inner teeth. The shaft of these planetary gears rotates constantly around the propeller shaft. The adjustment is made by connecting two of these planetary gearings in series. For this purpose the planetary gears of one train of gears are made capable of angular displacement relative to those of the other train of gears on the planetary shaft. The adjustment can then be made by turning the gear with inner teeth so that the planetary gears of one planetary gearing are turned angularly relative to those of the other planetary gearing on the common planetary shaft. It is only in this way that the loose gear with inner teeth is displaced angularly relative to the fixed gear on the propeller shaft and an adjustment thereby accomplished.

In contrast with the foregoing, in the adjusting gearing, according to the present invention, a gearing is provided with two connecting gearings or groups of connecting gears, the shafts of which do not take part in the revolution of the main drive shaft, and which mesh on the one hand with the fixed drive gear and on the other hand with the loose adjusting gear. The connection between the two gearings or groups of gearings is made by an intermediate gear loose on the shaft of the fixed drive gear.

It is important, therefore, that the two gearings or groups of gearings, in contrast with the known planetary gearings, are connected together by a common intermediate gear freely turning on the propeller shaft, while the gearing shafts are mounted in a fixed manner. The adjustment is made in the device according to the invention by swinging a gearing shaft around the axis of the main drive shaft. The advantage of the adjusting gearing according to the invention is that the small gears that run at very high speeds in aircraft engines need not turn around the main drive shaft. In this way the bearing of these gears is simplified considerably so that it can be made lighter and above all more sure in operation.

The gearing of the present invention provides a positive unlimited range of adjustment which is accurate and independent of the engine speed.

In order more clearly to understand the invention, reference will be made to the accompanying drawing, which illustrates diagrammatically and by way of example, several embodiments of the variable gear according to the invention.

Fig. 1 illustrates a form of construction in which the propeller shaft is integral with the engine shaft and the adjusting gearing is grouped around the propeller shaft.

Fig. 2 shows a diagram of the adjusting operation.

Fig. 3 relates to the case where a transmission gearing is provided between the engine and the propeller shaft.

Fig. 4 shows a form of construction especially suitable for ship's screws.

In Fig. 1, the adjusting gearing is housed in an enclosed gear case located between the power unit and the propeller and concentric with the propeller shaft 1. It consists of two relatively rotatable halves, one of which 2 may be connected to the engine, whilst the other 3 is adapted to be rotated, for adjusting the propeller, by means of a hand wheel or crank 4 as shown in the drawing. Each half of the gear case is provided with one or more fixed pins 5 and 6 disposed in a circle around the engine shaft and carrying the hollow shafts—which represent—in principle, two countershafts operating in series—of the pinions 7 and 8, 9 and 10 respectively. These pinions cooperate with the other pinions in such a manner that, when the propeller is not adjusted, the rotation of a pinion 11—which is keyed on the engine shaft—through an intermediate pinion 12, adapted to rotate in relation to the engine shaft, is transmitted to an idle pinion 13 also mounted on the engine shaft, so that this latter pinion rotates with the same angular velocity as the engine shaft, that is to say, is stationary in relation to said shaft. Now, since this pinion 13 is connected—for example through cone or worm gearing 14—with the propeller blades 16, which are adapted to turn about their longitudinal axis to the hub 15, a positive twist is imparted to the propeller blades directly the pinion 13 is adjusted in relation to the engine shaft.

This adjustment is effected by turning the half 3 of the gear case through a definite angle by means of the hand crank 4. By this movement, one 6 of the two countershafts is turned, in relation to the other shaft 5, around the axis of the engine shaft, relative twists being produced, as shown in Fig. 2. Since these are independent of the speed of the engine shaft, and therefore must also be identical both when the engine is at rest or is running at any speed, they are represented, by way of example, when the engine is at rest. At the same time, the pinion 11 keyed on the engine shaft is at rest, so that, even on the half 3 of the gear case being turned, the intermediate pinion 12, connected therewith through the gears 7, 8 must also be stationary. This implies that, on the pin 6 being turned through the angle α, the point of application A of the pinion 9 in the intermediate pinion 12, must be regarded as a fixed point and consequently, in accordance with the motion diagram shown in Fig. 2, the pinion 13 must undergo a relative displacement through the angle β a result that is equivalent to a corresponding adjustment of the propeller.

When the engine is in operation and the propeller shaft 1 therefore has a definite number of revolutions with the gear 11 fixed on the same, the loose gear 13 has then the same number of revolutions due to introduction of the connecting gearing 7, 8, 9, 10 and the loose intermediate gear 12 forming a connection between the drive gear 11 of the shaft 1 and the gear 13. A relative angular displacement between the gears 13 and 11 is produced only when an angular displacement of the half 3 of the housing and consequently of the gearing 9, 10, is produced by means of the adjusting gearing 4 in the way described above.

If an increasing or reducing gear is already present, its pinions may be utilized for the variable gear of the present invention. An example of this is shown in Fig. 3. The pinions 23 and 24 provided for transmitting power from the engine shaft 1 to the separate propeller shaft 21 are incorporated in the variable gear. The shaft of the one countershaft of the embodiment described with reference to Figs. 1 and 2, now serves also as the driving shaft, the arrangement being otherwise—in principle—the same as before, except that, for reasons of convenience, the intermediate pinion 12 is replaced by two pinions 25 and 26 mounted on a hollow shaft. The gearing 9 and 10 which is rockable for adjustment purposes, is again mounted on a pin 6 of the gear case half 3 which is adapted to be rotated around the propeller shaft by means of the hand crank 4.

The transmission gears 23, 24, are linked into the adjusting arrangement, the connecting gears 23 and 27 corresponding to the connecting gears 7, 8 of Fig. 1. The loose intermediate gear 12 of Fig. 1 is replaced in Fig. 3 by two gears 25 and 26 mounted on a hollow shaft, i. e. loose on the shaft 21. Here also the connecting gears 23, 27, 9 and 10 again do not take part in the circling of shaft 21 and the connection between the drive gear 24 and the loose adjusting gear 13 is made by the loose intermediate gearing 25, 26.

The embodiment of Fig. 4 shows the application of an auxiliary shaft 31 for the variable gear, an arrangement which may be of advantage in the case of marine propellers with propeller shafts of very large diameter, since it allows a space-saving side structure of the adjusting arrangement beside the screw shaft. In the case of Fig. 4, the adjustable part 3 of the housing of Figs. 1 and 3 is replaced by a gear 3' that is capable of angular displacement on the secondary shaft 31 by means of the drive 4, and for connection between secondary shaft 31 and screw shaft 1', the gears 18, 19 are provided meshing with the fixed drive gear 11 and the loose adjusting gear 13. Nothing, therefore, is changed in the basic principle of the adjusting arrangement according to Fig. 1.

It is to be understood that the invention is not restricted to the particular constructions which have been illustrated as typical embodiments of the invention, and that various changes may be made without departing from the spirit of my invention as set forth in the following claims.

I claim:—

1. Adjusting gearing for variable pitch propellers consisting of a drive shaft, a drive gear rigidly connected to said drive shaft, a gear capable of angular displacement relative to the drive gear and loose on said drive shaft, two connecting gearings meshing on the one hand with the drive gear and on the other hand with said gear capable of angular displacement, an intermediate gear connecting said two connecting gearings, and means for angular displacement of one of said two connecting gearings.

2. Adjusting gearing according to claim 1 in which the intermediate gear is rotatably mounted on the drive shaft.

3. Adjusting gearing according to claim 1 in which the intermediate gear is mounted on a shaft parallel to the drive shaft.

4. Adjusting gearing for variable pitch propellers comprising a propeller shaft having a propeller hub fixed thereto, propeller blades each having a root portion mounted on said hub for angular adjustment, an adjusting shaft coaxial with said propeller shaft and capable of relative rotation with respect thereto, gearing between said adjusting shaft and said blade roots for rotating said blades upon relative rotation of said adjusting shaft and said propeller shaft, a drive shaft for rotating said propeller shaft, and adjustable gear means between said drive shaft and said adjusting shaft for rotating the latter; said adjustable gear means comprising a sun wheel mounted on a stationary axis, connecting gearing between said drive shaft and said sun wheel for rotating the latter, a relatively stationary stub shaft, connecting gearing rotatably mounted on said stub shaft for driving said adjusting shaft from said sun wheel and at the same speed as said propeller shaft, and means adjustable at will for displacing said relatively stationary stub shaft angularly with respect to the axis of said sun wheel, thereby to effect a relative rotation of said adjusting shaft with respect to said propeller shaft.

5. Adjustable gearing as claimed in claim 4, wherein said propeller shaft and said drive shaft are integral portions of the same shaft.

6. Adjustable gearing as claimed in claim 4, wherein said propeller shaft and said drive shaft are integral portions of the same shaft, and said sun wheel is rotatably mounted on the said integral shaft.

7. Adjustable gearing as claimed in claim 4, wherein said sun wheel is rotatably mounted on said propeller shaft, and a gear drive connects said drive shaft and said propeller shaft.

8. Adjustable gearing as claimed in claim 4, wherein said sun wheel is mounted on a shaft parallel to the propeller shaft.

HEINRICH EBERT.